United States Patent [19]
Jeffery et al.

[11] 4,043,632
[45] Aug. 23, 1977

[54] SCANNING POLYGON WITH ADJUSTABLE MIRRORS

[75] Inventors: Edwin A. Jeffery, Natick; Sigmund Hinlein, Sudbury, both of Mass.

[73] Assignee: Data General Corporation, Southboro, Mass.

[21] Appl. No.: 581,273

[22] Filed: May 27, 1975

[51] Int. Cl.$^2$ .............................................. G02B 27/17
[52] U.S. Cl. ........................... 350/7; 340/146.3 F
[58] Field of Search ................. 350/7, 6, 285, 310, 350/288, 299; 250/230, 234–236, 568; 178/7.6; 340/146.3 F, 146.3 D; 235/61.11 E

[56] References Cited

U.S. PATENT DOCUMENTS

| | | | |
|---|---|---|---|
| 1,666,594 | 4/1928 | Clark | 178/7.6 |
| 1,830,231 | 11/1931 | Karolus | 178/7.6 |
| 1,966,354 | 7/1934 | Noxon | 250/230 |
| 3,478,608 | 11/1969 | Met | 350/310 |
| 3,529,884 | 9/1970 | Ives et al. | 350/7 |
| 3,814,507 | 6/1974 | Osborn et al. | 350/285 |
| 3,889,102 | 6/1975 | Dahlquist | 250/568 |

FOREIGN PATENT DOCUMENTS

| | | | |
|---|---|---|---|
| 539,006 | 11/1931 | Germany | 178/7.6 |
| 458,923 | 12/1936 | United Kingdom | 178/7.6 |

*Primary Examiner*—Jon W. Henry
*Attorney, Agent, or Firm*—Donald Brown

[57] ABSTRACT

A scanning system and method for reading coded indicia carried on containers, etc., the system and method including means for generating in a predetermined sequence a first light pattern, and a second light pattern, and means for focusing same at a window over which containers carrying the coded indicia are positioned. The disclosure also includes a mirrored rotatable polygon structure including a plurality of mirrors, some of which are inclined at a positive angle and the others which are positioned at a negative angle with respect to the polygon axis of rotation as well as means for adjusting the incline of the mirrors.

4 Claims, 12 Drawing Figures

PATTERN A

PATTERN B

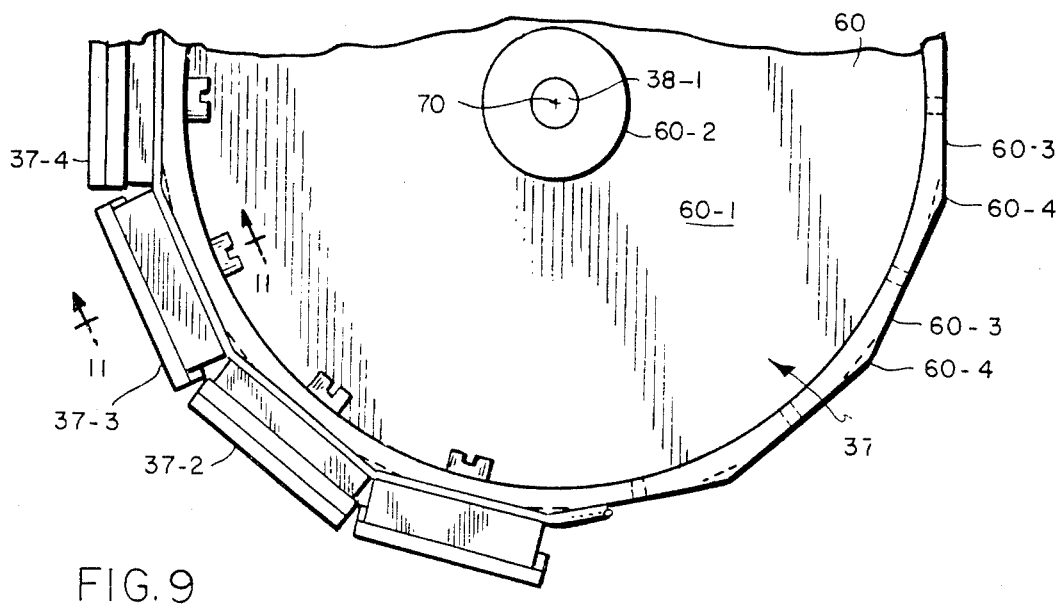
FIG. 9
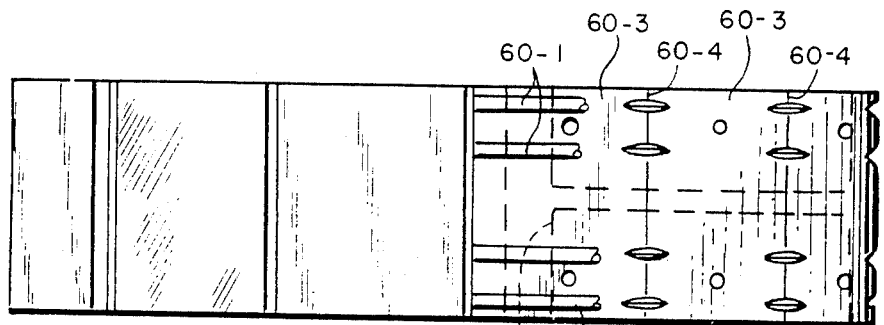
FIG. 10
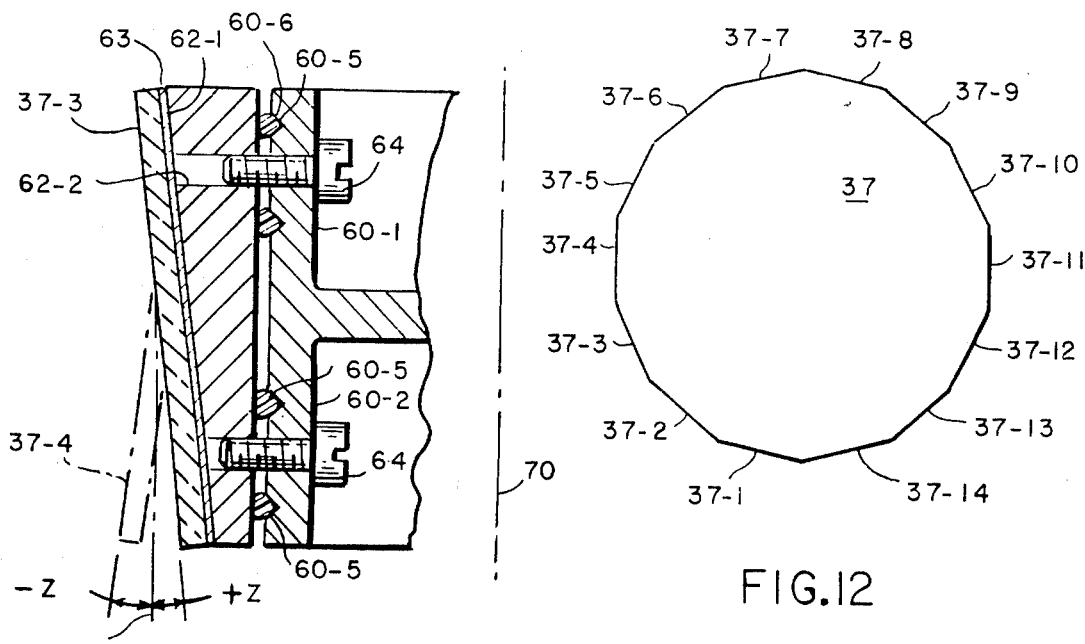
FIG. 11
FIG. 12

SCANNING POLYGON WITH ADJUSTABLE MIRRORS

BACKGROUND OF THE DISCLOSURE

This invention relates to a system and a method for scanning indicia such as bar coded indicia used on packaging to indentify products.

As is now well known, systems have been developed to scan such conventional bar coded indicia, commonly referred to as UPC indicia and such systems have found acceptance in the supermarket industry.

Such UPC coded packages are currently scanned by a device at the check-out stations in a supermarket and the information detected from the label is fed to a computer which then generates the price to be charged to the customer for each item.

While the UPC indicia is easily applied to packages at the factory the tolerances between the bars of the UPC indicia make it quite difficult to add the code to a package not containing the code when it arrives at the supermarket.

In view of the difficulty in adding the UPC indicia at the supermarket, a different bar coded indicia presentation which can easily be added to packages at the supermarket has been developed. Such coded indicia is known as tri-bar coded indicia and is disclosed in U.S. Pat. Application Ser. No. 421,884, filed Dec. 5, 1973, now U.S. Pat. No. 3,947,826 and assigned to the same assignee as is this application.

While schemes exist for scanning the UPC indicia they are not particularly compatible with schemes needed to accurately scan the tri-bar indicia.

Accordingly, there has developed a need for a scanning system and method for accurately scanning either the UPC or tri-bar indicia. The present invention provides such a scanning system and method. In addition, the present invention provides a new and improved mirrored polygon structure.

SUMMARY OF THE DISCLOSURE

This invention provides a new and improved scanner and method for accurately reading both tri-bar and UPC coded indicia. In this invention a plurality of different configuration light patterns are generated in a predetermined sequence in order to accurately read both types of coded indicia.

In the preferred embodiment of this invention each light pattern configuration is repeated in a predetermined sequence but is offset in space from the immediate prior light pattern of the same configuration.

The light patterns in the preferred form of this invention comprise a first pattern of an X configuration and the second pattern of an X configuration.

In the preferred form of the invention the means for generating the light patterns include a rotating polygon supporting reflecting means such as mirrors which are alternately tipped at different + and − angles (normally called the pyramidal angle) to the axis of polygon rotation to direct the beam used to generate the light patterns through two different sets of fixed mirrors.

In the preferred construction of the polygon a predetermined number of the mirrors positioned at the + and − angles are each positioned at a different angle and are each independently adjustable to set their angular position.

The preferred polygon of this invention also includes a resilient biasing means upon which said mirrors are urged so that adjustment of the angle of each mirror may be easily made during final testing of the scanner.

BRIEF DESCRIPTION OF THE DRAWINGS

FIG. 9 is a top plan view of a portion of the mirrored polygon shown in FIGS. 6–8;

FIG. 10 is a side view of the mirrored polygon with some of the mirrored surfaces removed to show mounting of the mirrors thereof;

FIG. 11 is a sectional view taken on line 11—11 in FIG. 9; and

FIG. 12 is a top diagrammatic view illustrating the fourteen mirrors of the polygon structure used in the preferred construction of the polygon.

Figure 1:
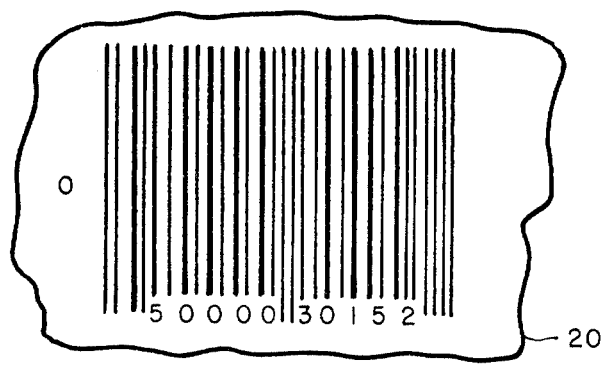
FIG. 1 is an enlarged view of a portion of a container label bearing the conventional UPC (universal product code).
Figure 2:
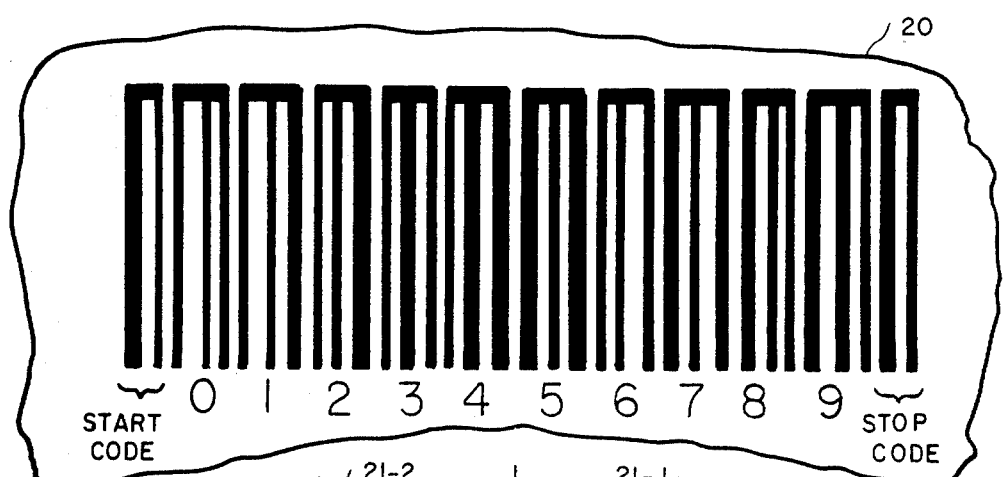
FIG. 2 is an enlarged view of a portion of a container label bearing the tri-bar code.

Reference should now be had to FIGS. 1 and 2 which illustrate a sample of UPC and tri-bar indicia positioned on a record medium 20 such as a label of a product container.

The UPC code is the generalized code which appears on most products sold in supermarkets in the United States of America. Accordingly, no further description thereof will be needed for those skilled in the art.

The tri-bar code is a code which has been disclosed in U.S. Pat. application Ser. Nos. 421,884 now U.S. Pat. No. 3,947,826 and 421,885 now U.S. Pat. No. 3,891,831 both filed on Dec. 5, 1973 and Dec. 12, 1973, respectively, and both assigned to the assignee of this application, the disclosure of these applications being incorporated herein by reference hereto.

With particular reference to FIG. 2 a tri-bar code is shown positioned on a record medium 20 for the digits zero through nine. Also shown, is a two bar coded character for start/stop commands. As illustrated, no bar is wider than two modules or bits, and no space between two bars in a character code is wider than two modules. It is also noted, that in each encoded character no two consecutive modules of a first level (e.g., black) are followed by two consecutive modules of a second level (e.g., white). It should also be understood the tri-bar code depicted could comprise a font of type from which the code is printed. A start/stop symbol represented by two bars is also shown.

The present invention provides a new and improved scanner for optimally reading both said UPC and tri-bar codes. In particular, the present invention as shown in FIG. 3 provides two light patterns of different configurations comprising a first set of trace lines 21-1 and 21-2 (pattern A) and a second set of trace lines 22-1, 22-2, and 22-3 (pattern B) which are directed to a location (e.g., a window location where indicia (UPC or tri-bar) supported by containers may be scanned by the light patterns.

Figure 3:
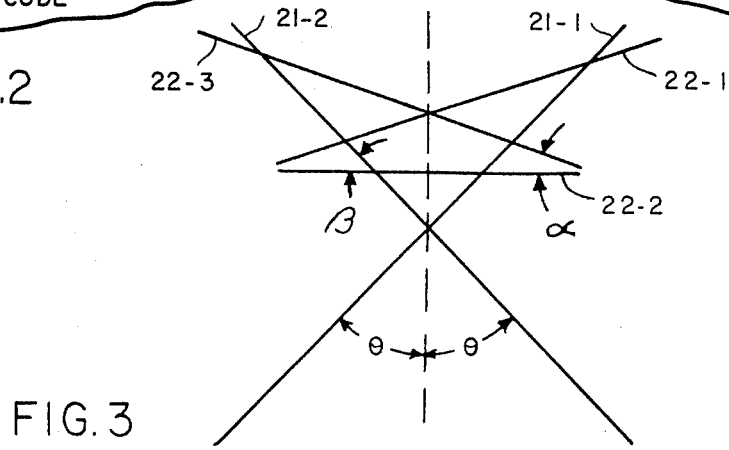
FIG. 3 represents the different light scanning patterns superimposed upon one another although they are actually generated at different times.

Although each of the patterns A and B appear superimposed one over the other in FIG. 3 as if frozen in time, in actual practice first one pattern is generated and then the other pattern is generated.

Figure 4:
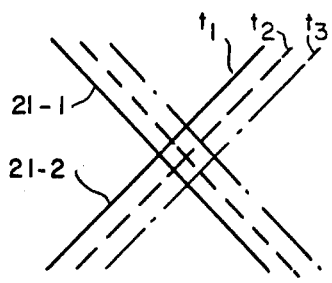
FIG. 4 illustrates that each X light pattern is offset in position or location from the next preceding X light pattern generated during rotation of the polygon.
Figure 5:
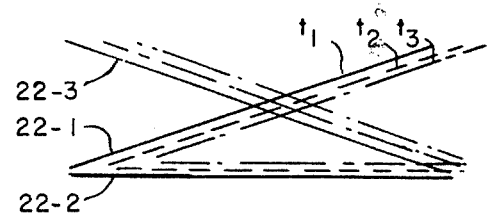
FIG. 5 illustrates that each X light pattern is also offset or shifted in position or location from the next preceding X light pattern generated during rotation of the polygon.

Thus preferably only one pattern A or B at a time is being used for scanning purposes. As another preferred feature of this invention as shown in FIGS. 4 and 5, each of the light patterns of the same type or configuration are preferably generated so that each next succeeding pattern (of the same configuration) is offset in space a small distance away from the trace lines of the preceding light pattern (of the same configuration) in order to reduce the average light level generated at the window location to which the light patterns A and B are directed. This is particularly important in cases where high power light beams generated by lasers are preferably used as in this invention.

It should also be understood that after a predetermined number of sequentially spaced patterns A or B are generated time as shown in FIGS. 4 and 5 (solid line indicating trace lines at $t_1$ and dotted lines indicating trace lines at later $t_2$ and $t_3$ times), the patterns will be repeated again as shown in solid trace lines in approximately the same position. In the preferred form of the invention each solid line pattern shown will be repeated after 1 revolution of the mirrored polygon.

Thus in the preferred form of this invention the light patterns A and B are sequentially generated in a predetermined order and each of the next successive light pattern of the same type configuration is also generated in a manner such that it will be offset or wobbled in space from the next preceding light pattern of the same configuration when it appears at the location to which it is directed to scan coded indicia.

Reference should again be had to FIG. 3 which illustrates in a top view at the window 30 (shown dotted in the top plan view of FIG. 6) the orientation at which patterns A and B would appear if superimposed one on the other (frozen in time). It should be understood that in fact for pattern A, one trace line e.g., 21-1 is first generated by the beam of light starting from one end of the trace line and moving to the other end of the trace line and thereafter the beam then moves from a point at one end of the trace line 21-2 to the other end thereof.

With respect to pattern B, the same takes place and the beam first generates trace line 22-1, then trace line 22-2 and lastly trace line 22-3. Obviously, the precise order of generation of the trace lines for each pattern may vary as would be apparent to those skilled in the art.

In the configuration of pattern A, trace lines (length of trace path) 21-1 and 21-2 are preferably about 8½ inches long and lie at an $\theta$ of about 40° to 55° with respect to a vertical line (shown dotted) intersecting trace line 22-2 at about 90°. Most preferably the angle $\theta$ is 45°.

Pattern A trace lines 21-1 and 22-3 on the other hand are preferably about 5⅜ inches long and trace line 22-2 is preferably about 5 inches long. Trace lines 22-1 and 22-3 are essentially at an angle $\alpha$ of about 16° to 25° with respect to trace line 22-2 with the angle $\alpha$ most preferably being about 18° in order to optimize reading speed for the tri-bar code of FIG. 2. The trace line 22-2 of pattern B is preferably offset as shown from the intersection of trace lines 21-1 and 22-2 of pattern B a distance of about ⅜ to ¼ inches at the point where it intersects with the vertical reference line to minimize the trace line cross-overs to decrease average light levels. In addition, the angle $\beta$ between trace line 21-1 and 21-2 with respect to trace line 22-2 is preferably about 40° to 55° with 45° being most preferred.

In practice it is most preferred that the sum of the length of the trace lines of pattern A be substantially equal to the length of the trace lines of pattern B.

Figure 6:
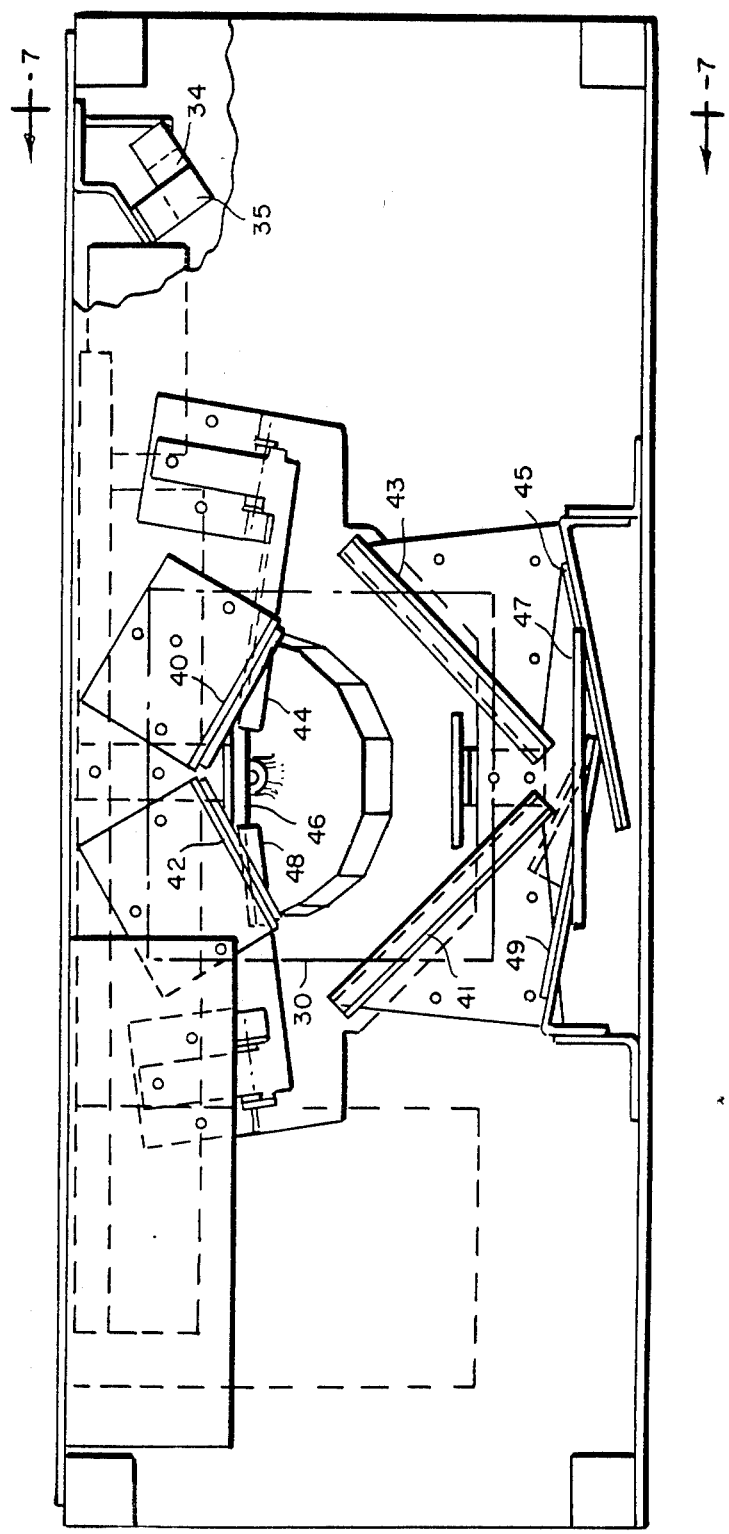
FIG. 6 is a top plan view with parts removed showing the scanner.
Figure 7:
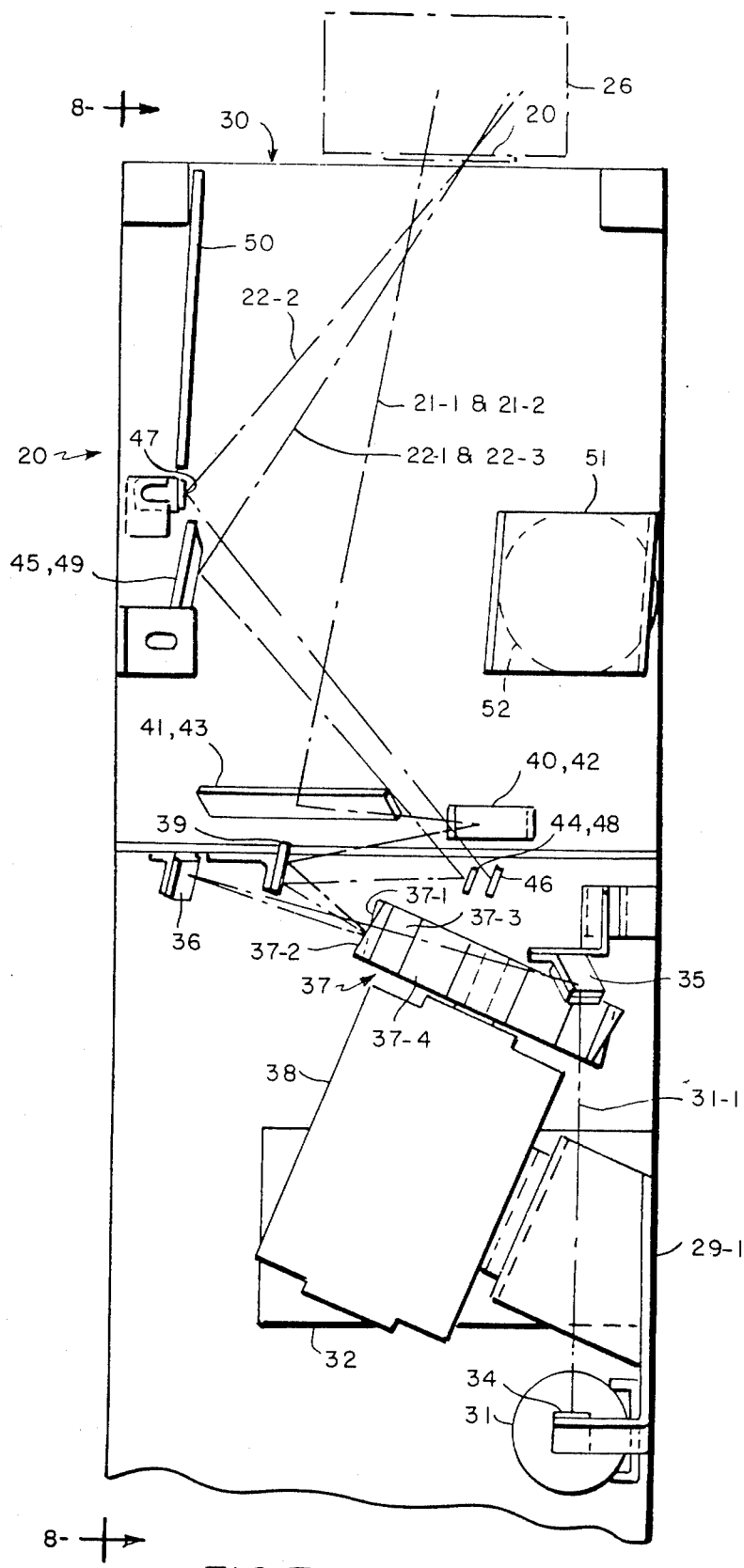
FIG. 7 is a view taken along line 7—7 in FIG. 6.
Figure 8:
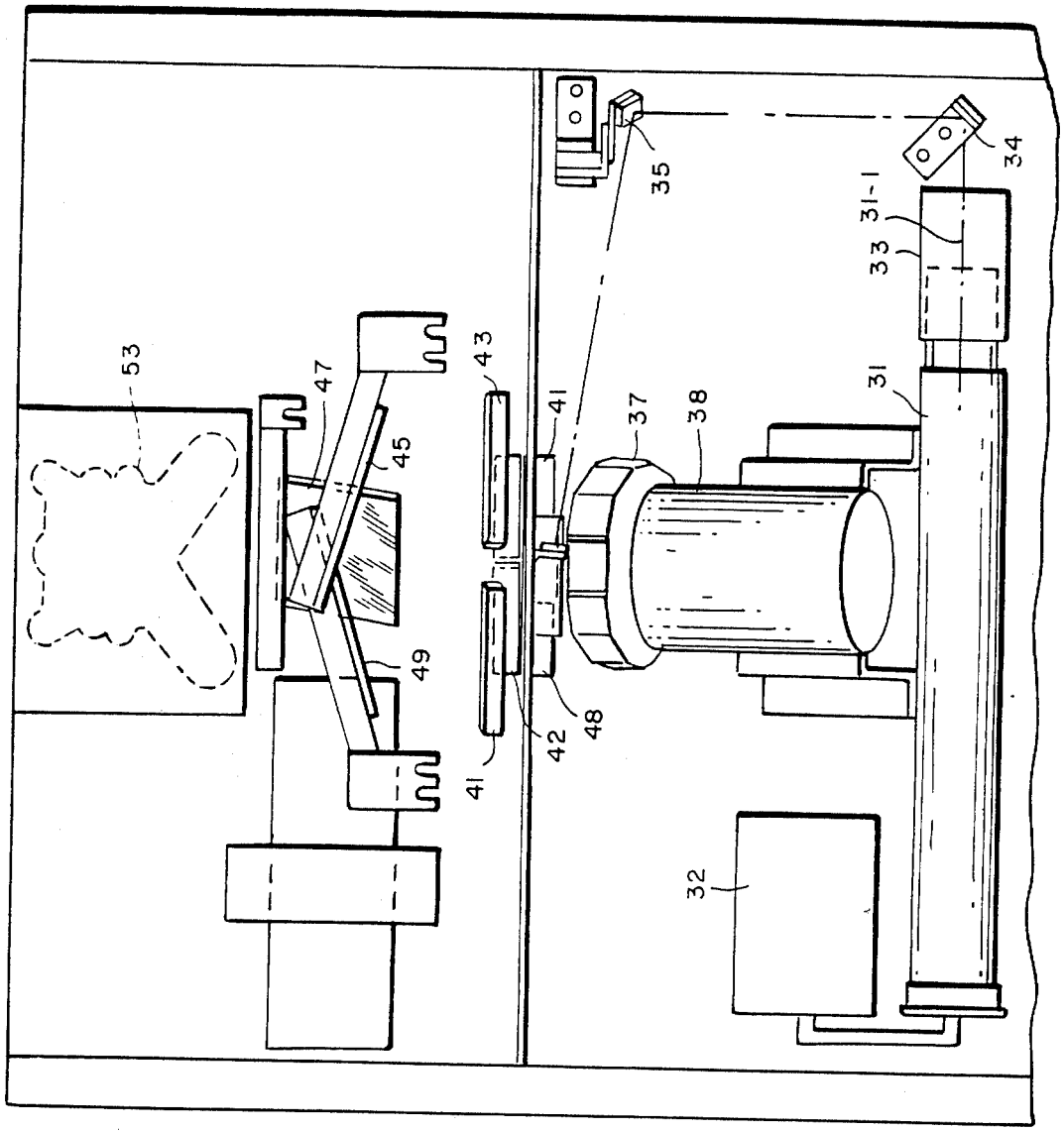
FIG. 8 is a view taken along line 8—8 in FIG. 7.

Reference should now be had to FIGS. 6–8 for a description of the apparatus for sequentially generating the light patterns A and B.

In FIG. 7 there is shown a container 26 bearing a recording medium 20 carrying indicia (UPC or tri-bar). The container 26 is positioned so that the coded indicia may be scanned by trace lines of patterns A and B provided by scanner 29 at window 30 e.g., of glass.

The container 26 may be moved across the window 30 by hand or alternatively mechanical conveyor means may be provided. In order to generate the light patterns A and B, there is provided a light source, preferably a coherent light source e.g., a gas laser 31 powered from a power supply 32 in a conventional manner with both the laser and supply 32 supported by the walls 29-1 of the scanner 29.

A suitable continuous gas laser providing light at a wave length of 6328 Anstrom may be used in the practice of this invention, although it should be understood that the actual type of light source and wave length may vary as would be apparent to those skilled in the art.

The light beam 31-1 from the laser passes through a conventional expander 33 and thence is directed by mirrors 34, 35 and 36 against mirrors of a polygon 37 which is rotated by a motor 38. A preferred rotational speed of the polygon is about 3400 to 3600 RPM.

The expander is used to increase the size of the beam and decrease the divergence of the beam as is well known in the art.

The polygon preferably comprises fourteen mirrors 37-1 to 37-14 which are inclined or tipped at angles with respect to the axis of rotation of the polygon (see FIGS. 9–12) to direct the beam of light from the laser to a distribution mirror 39 and then to two different sets of fixed mirrors in order to generate either scanning pattern A or B.

Each mirror or facet 37-1 to 37-14 of the polygon causes the generation of the entire pattern A or B. The first set of fixed mirrors is shown at 40, 41, 42, and 43. Mirrors 40 and 41 are positioned to generate trace lines 21-1 of pattern A and the mirrors 42 and 43 are provided to generate the other of the trace lines 21-2 of pattern A. Pattern A trace lines 21-1 and 21-2 are shown as dot-dash lines in a side view in FIG. 7.

In the scanner of the invention the trace lines of pattern B are generated using fixed mirrors 44, 45, 46, 47, 48 and 49.

Mirrors 44 and 45 are used to generate trace line 22-1, mirrors 46 and 47 are used to generate trace line 22-2 and mirrors 48 and 49 are used to generate trace line 22-3. The mirrors are fixed in the positions shown to the walls 29-1 using conventional brackets and supports in order to generate the patterns A and B at the window 30.

In order to recover the information from the codes on product containers, reflected light is detected by the use of collection mirrors 50 and 51 which direct the reflected light into a photomultiplier 52.

In the preferred construction the collector is preferably masked by screening with a low reflecting material e.g., black ink in the pattern 53 as shown dotted in FIG. 8 to decrease background light thus increasing sensitivity.

Reference should now be had to FIGS. 9-12 which illustrates the preferred multifaced mirrored polygon used in this invention.

FIG. 12 illustrates in a top diagrammatic view polygon mirrors 37-1 to 37-14 supported by the polygon hub or wheel 60 and FIGS. 9-11 illustrates in detail the construction of the mirrored polygon 37. The polygon 37 is provided with a hub 60 which is constructed with top and bottom cutouts 60-1 and 60-2 and is supported by a motor drive shaft 38-1 in a conventional manner for rotation.

The hub 60 is provided with fourteen flat faces 60-3, one for each of the mirrors 37-1 to 37-14. The corner 60-4 between each of the flats is provided with locating slots or grooves 60-5 in which there is positioned O rings 61 of elastomeric material such as neopreme e.g., by snapping same into the slots. Other elastomers may also be used.

Four O rings 61 are supported in the slots about the circumference of the hub 60 and extend over the flats as shown. It should also be understood that sheets or strips of elastomeric material may be used in place of the O rings.

Positioned over the flats are supporting blocks 62 having inclined surfaces 62-1 upon which the mirrors 37-1 to 37-14 are cemented i.e., by epoxy cement 63. The inclined surface 62-1 sets the rough angle of the mirrors so that the beam of light from the mirror 39 can be directed at the two sets of mirrors to generate patterns A and B.

As an important feature of this invention, the supports 62 are provided with threaded holes 62-2 for receiving adjusting screws 64 positioned in holes 60-6 of the hub 60 side wall. The screws 64 (two for each support 62) are used to adjust the angular position of the mirrors 37-1 to 37-14 with respect to flats 60-3 and against the elastomer rings 61.

In the preferred form of the invention the mirrors 37-1 to 37-14 are adjusted so that the faces thereof are at the following angle Z as shown on the page below. The angles Z are taken with respect to the center line 70 of the shaft and are shown in FIG. 11 with (for convenience) respect to line 71 which is parallel to shaft center line 70.

| MIRROR NO. | MIRROR ANGLE Z (PYRAMIDAL ANGLE |
| --- | --- |
| 37-1 | + 7° 40 " |
| 37-2 | − 7° 40 " |
| 37-3 | + 7° 1' 20 " |
| 37-4 | − 7° 1' 20 " |
| 37-5 | + 7° 2' |
| 37-6 | − 7° 2' |
| 37-7 | + 7° 2' 40 " |
| 37-8 | − 7° 2' 40 " |
| 37-9 | + 7° 3' 20 " |
| 37-10 | − 7° 3' 20 " |
| 37-11 | + 7° 4' |
| 37-12 | − 7° 4' |
| 37-13 | + 7° 4' 40 " |
| 37-14 | − 7° 4' 40 " |

FIGS. 7 and 11 particularly show that alternate mirrors, i.e., odd numbered mirrors are tipped at one angle to direct the beam at the distributor mirror 39 so that pattern B is generated and the even numbered mirrors are oppositely tipped to direct the beam at the distributor mirror 39 so that the pattern A is generated.

FIG. 11 shows mirror 37-4 (dotted in) to show its opposite angular relationship with respect to mirror 37-3. As may now be clear from the above description, patterns A and B are preferably generated one after the other although it should be understood that the sequencing of the patterns A or B may be varied e.g., four A patterns and then seven B patterns and then three A patterns may be generated.

In addition, the number of A and B patterns may also be varied e.g., eight A patterns and 6 B patterns may be generated as will be apparent to those skilled in the art by changing the number of + and − inclined mirrors.

We claim:

1. A rotatable polygon comprising a hub, said hub having a plurality of flat faces positioned about the circumference thereof, said faces intersecting each other at corners and each of said corners having a plurality of locating slots, a plurality of O rings of elastomeric material, each O ring positioned in a different locating slot of each of said corners, and lying over said faces, a plurality of supports each having a mirror coupled thereto, and adjustable means supported by said hub and coupled to said supports for urging said supports against said O rings, adjustment of said adjustable means orienting said mirrors with respect to the axis of rotation of said polygon.

2. The polygon of claim 1 wherein each mirror is oriented at a different angle with respect to the axis of rotation of the hub.

3. The polygon of claim 1 in which some of the mirrors are oriented in one direction and some of the others are oriented in an opposite direction.

4. The polygon of claim 1 in which said O-rings are snapped into said locating slots of said hub.

* * * * *